United States Patent
Kubinski et al.

(10) Patent No.: US 8,783,018 B2
(45) Date of Patent: *Jul. 22, 2014

(54) REDUCTANT STORAGE SENSING SYSTEM AND METHOD

(75) Inventors: David John Kubinski, Canton, MI (US); Devesh Upadhyay, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 107 days.

This patent is subject to a terminal disclaimer.

(21) Appl. No.: 13/431,367

(22) Filed: Mar. 27, 2012

(65) Prior Publication Data
US 2012/0180461 A1    Jul. 19, 2012

Related U.S. Application Data

(63) Continuation of application No. 11/681,105, filed on Mar. 1, 2007, now Pat. No. 8,141,347.

(60) Provisional application No. 60/743,401, filed on Mar. 3, 2006.

(51) Int. Cl.
F01N 3/00 (2006.01)
F01N 3/10 (2006.01)

(52) U.S. Cl.
USPC .............. 60/286; 60/274; 60/295; 60/301; 60/303

(58) Field of Classification Search
USPC ........... 60/274, 276, 277, 286, 295, 300, 301, 60/303
See application file for complete search history.

(56) References Cited

U.S. PATENT DOCUMENTS

| | | | |
|---|---|---|---|
| 5,651,088 A | 7/1997 | Abe et al. | |
| 6,240,722 B1 | 6/2001 | Busch et al. | |
| 6,742,326 B2 | 6/2004 | Xu et al. | |
| 6,833,272 B1 | 12/2004 | Binder et al. | |
| 6,959,540 B2 | 11/2005 | Itoh et al. | |
| 7,093,427 B2 | 8/2006 | van Nieuwstadt et al. | |
| 7,200,990 B2 | 4/2007 | Gabrielsson et al. | |
| 7,418,816 B2 | 9/2008 | Upadhyay et al. | |
| 2002/0182127 A1 | 12/2002 | Braun et al. | |
| 2006/0248876 A1 | 11/2006 | Taxon | |
| 2009/0133383 A1 | 5/2009 | Shost | |

FOREIGN PATENT DOCUMENTS

EP    1772599 A2    4/2007
JP    58085315 A    5/1983

OTHER PUBLICATIONS

Lambert, Christine et al., "Application of Urea SCR to Light-Duty Diesel Vehicles," SAE Technical Paper Series No. 2001-01-3623, International Fall Fuels and Lubricants Meeting and Exposition, San Antonio TX, Sep. 24-27, 2001, 8 pages.

Moos, Ralf et al., "Selective Ammonia Exhaust Gas Sensor for Automotive Application," Sensors and Actuators B, vol. 83, 2002, pp. 181-189.

Tronconi, Enrico et al., "Modelling of an SCR Catalytic Converter for Diesel Exhaust After Treatment: Dynamic Effects at Low Temeperature," Catalysis Today, vol. 105, 2005, pp. 529-536.

*Primary Examiner* — Thomas Denion
*Assistant Examiner* — Diem Tran
(74) *Attorney, Agent, or Firm* — Julia Voutyras; Alleman Hall McCoy Russell & Tuttle LLP

(57) ABSTRACT

A catalyst supported on a substrate includes a heater embedded in a sub-region of the substrate to heat a local region of the catalyst. The amount of ammonia stored on the catalyst may be determined and controlled through conductivity measurements in the locally heated portion of the system described.

13 Claims, 6 Drawing Sheets

REDUCTANT STORAGE SENSING SYSTEM AND METHOD

CROSS REFERENCE TO RELATED APPLICATIONS

The present application is a continuation of U.S. application Ser. No. 11/681,105, filed Mar. 1, 2007, which claims priority to U.S. Provisional Patent Application No. 60/743,401, filed Mar. 3, 2006, the entire contents of which are incorporated herein reference for all purposes.

FIELD

This present application relates to an emission control system operation in which an amount of ammonia stored in an SCR catalyst is determined and controlled in order to reduce emissions and improve engine performance.

BACKGROUND AND SUMMARY

The reduction of NOx emissions from diesel vehicles is desired. One approach uses a urea Selective Catalytic Reduction (SCR) exhaust after-treatment system. In the urea-based SCR catalyst, a reductant, such as NH3 (formed from the injection of aqueous urea, for example), reacts selectively with NOx with the products being N2 and H20.

In one approach, a control system attempts to control an amount of reductant stored on the urea-SCR system, in order to provide sufficient reductant for NOx reaction, but while reducing reductant emitted. For example, a model may be used to predict the NH3 storage in the catalyst based on various operating parameters, which may include exhaust sensors. To reduce modeling errors, such as due to changes in the NH3 storage capability of the catalyst, ammonia sensor downstream of the catalyst may be used.

U.S. Pat. No. 6,240,722 describes an example approach where a sensor indicates the NH3 storage levels of the SCR-catalyst. Specifically, the fullness of a reagent on a catalyst is determined by measuring some physical property that changes with gas storage. For example, NH3 storage on an SCR catalyst can be determined by measuring the change in impedance of a portion of the catalyst due to changes in NH3 storage.

The inventors herein have recognized a disadvantage of such an approach. For example, depending on the operating conditions, the change in impedance may not be significant or detectable and thus accuracy may be degraded.

To address at least some of the above issues, a system or method may be used in which the catalyst material itself can be used, where the conductivity of a portion of the catalyst material may be correlated to a stored reductant level, such as an amount of stored NH3 on the catalyst portion. In one particular embodiment, a method may be used where the conductivity may be monitored over a temperature change sufficient to desorb (or oxidize) stored reductant. As such, the resulting change in conductivity upon the catalyst material heating may be correlated (e.g., via a measured current) to an amount of reductant loading. The temperature change may be induced repeatedly at a frequency to provide sufficient information for updated estimates of reductant storage and to provide adjustment to injected reductant. Further, various additional factors may be considered in correlating the conductivity to reductant loading, such as the storage duration, reductant concentration, and exhaust gas temperature. In another embodiment, a plurality of sensors may be used at multiple locations along a direction of exhaust gas flow (e.g., length) of the catalyst to provide more accurate control of reductant injection, as well as for catalyst diagnostics, etc. In still another embodiment, the sensed reductant storage information may be used to adjust reductant injection.

In one particular embodiment, a system may utilize electrodes which are embedded within an NH3-storing layer of an SCR catalyst, along with an embedded heater used to desorb ammonia stored in the catalyst in the vicinity of the heater at selected conditions. The system may also determine temperature of the catalyst material between the electrodes and in the vicinity of the heater. Specifically, the embedded heater allows a portion of the catalyst substrate to be heated to a higher temperature than surrounding or adjacent substrate, thus liberating the stored NH3 in the heated portion. The resulting change in electrical conductivity of the heated portion, upon heating, may then be correlated to an overall ammonia loading on the SCR catalyst. Thus, information about the stored NH3 levels prior to heating can be obtained and overall ammonia storage capacity of the catalyst can be inferred.

An advantage of such an approach is that by heating up a portion of the catalyst and desorbing some or all of the stored ammonia from that portion, a higher and more accurate signal may be generated.

DETAILED DESCRIPTION

Figure 1:
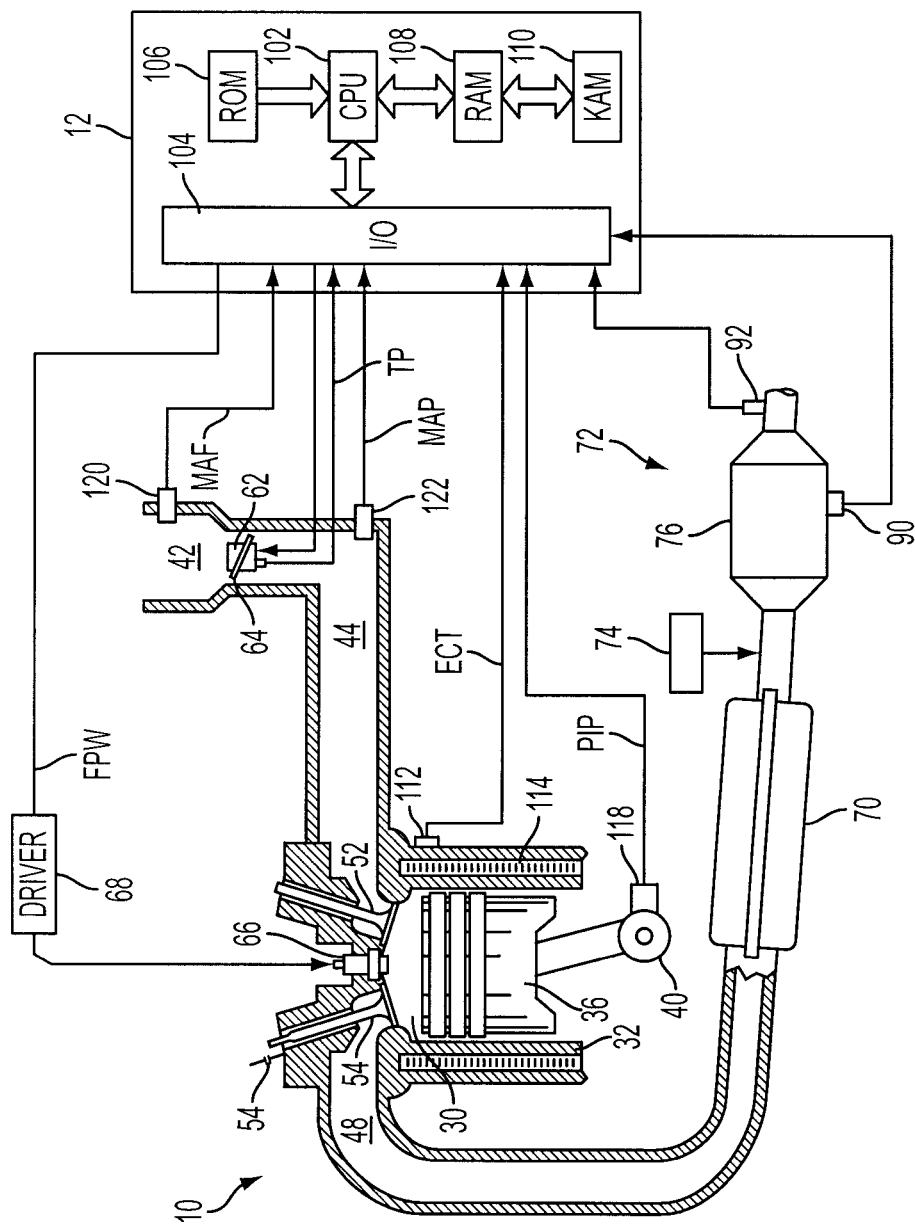
FIG. 1 shows an example engine system.

FIG. 1 shows an example internal combustion engine 10 comprising a plurality of combustion chambers, only one of which is shown. The engine 10 may be controlled by electronic engine controller 12. In one example, engine 10 may be a common rail direction injection diesel engine.

Combustion chamber 30 of engine 10 includes combustion chamber walls 32 with piston 36 positioned therein and connected to crankshaft 40. Combustion chamber 30 is shown communicating with intake manifold 44 and exhaust manifold 48 via intake valve 52, and exhaust valve 54. While this example shows a single intake and exhaust valve, one or more cylinders may include a plurality of intake and/or exhaust valves.

Fuel injector 66 is shown directly coupled to combustion chamber 30 for delivering liquid fuel directly therein in proportion to the pulse width of signal fpw received from controller 12 via electronic driver 68. Fuel may be delivered to fuel system (not shown) including a fuel tank, fuel pumps, and a common fuel rail (not shown). In some embodiments, engine 10 may include a plurality of combustion chambers each having a plurality of intake and/or exhaust valves.

Intake manifold 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake manifold 42 may also include a mass air flow sensor 120 and a manifold air pressure sensor 122 for providing respective signals MAF and MAP to controller 12.

Catalytic converter 70 is shown in communication with exhaust manifold 48. In some embodiments, catalytic converter 70 may be a diesel oxidation catalyst. An emission control system 72 is shown downstream catalytic converter 70. Emission control system 72 may include reductant storage device 74 and emission control device 76. Further, reductant storage device 74 may supply a reductant to an exhaust stream entering emission control device 76. The reductant may include ammonia, urea, and/or various other reductants such as hydrocarbons, diesel fuel, etc. While not shown, a particulate filter may also be coupled downstream of device 76.

In one embodiment, device 76 may include an SCR catalyst, where the catalyst may be porous. The SCR catalyst may be configured to operate most efficiently between 200° C. and 350° C., and may be able to store some of the injected reductant, such as NH3. In one example approach, the levels of NH3 injected into the exhaust (via urea) may be adjusted to approximately match the engine NOx emission levels over a specific time interval, taking into account the amount of NH3 stored on the catalyst, and the distribution of the storage in the catalyst (e.g., the distribution of storage levels along the length of the catalyst). Such an approach may be used to reduce under-injection and over-injection of urea, as discussed herein. Specifically, under-injection of urea may lead to a lower conversion rate resulting in higher tailpipe NOx emission, whereas a catalyst loaded with an appropriate amount of NH3 may yield a high NOx conversion rate. On the other hand, over-injection of urea may also affect performance, as it may lead to increased NH3 emissions (which may be referred to as NH3 slip).

By considering reductant storage, it is possible to address the inadvertent release of reductant due to high temperature excursions. For example, at higher exhaust gas temperatures (near 350° C. and above), the ability to store NH3 on the SCR catalyst may be reduced. With the excursions to high exhaust-gas temperatures expected in a typical drive cycle, "stored" NH3 on the SCR-catalyst may be liberated, leading to increased NH3 emissions. Additionally, this may lead to lower NOx conversion since the density of stored NH3 may be reduced.

To provide more accurate control of reductant injection and/or exhaust emission performance, one or more reductant loading sensors may be used in the exhaust system, such as indicated at 90. As described further below, the sensor(s) may be used to provide more accurate control of reductant injection.

Further, various additional exhaust sensor may also be used in emission control system 72, such as various NOx sensors, ammonia sensors, etc., denoted at 92.

Controller 12 is shown in FIG. 1 as a conventional microcomputer including: microprocessor unit 102, input/output ports 104, an electronic storage medium of executing programs and calibration values, shown as read-only memory (ROM) chip 106 in this particular example, random access memory (RAM) 108, keep alive memory (KAM) 110, and a data bus (I/O). Controller 12 may include code stored on computer readable medium that can be executed by the controller. Controller 12 is also shown receiving various signals from sensors coupled to engine 10, in addition to those signals previously discussed, including: engine coolant temperature (ECT) from temperature sensor 112 coupled to cooling sleeve 114; a profile ignition pickup signal (PIP) from Hall effect sensor 118 coupled to crankshaft 40 giving an indication of engine speed (RPM); throttle position TP from throttle position sensor 120; and absolute Manifold Pressure Signal MAP from sensor 122.

Combustion in engine 10 can be of various types, depending on operating conditions. While FIG. 1 depicts a compression ignition engine, it will be appreciated that the embodiments described below may be used in any suitable engine, including but not limited to, diesel and gasoline compression ignition engines, spark ignition engines, direct or port injection engines, etc. Further, various fuels and/or fuel mixtures such as gasoline, diesel, H2, ethanol, methane, and/or combinations thereof may be used.

Figure 2:
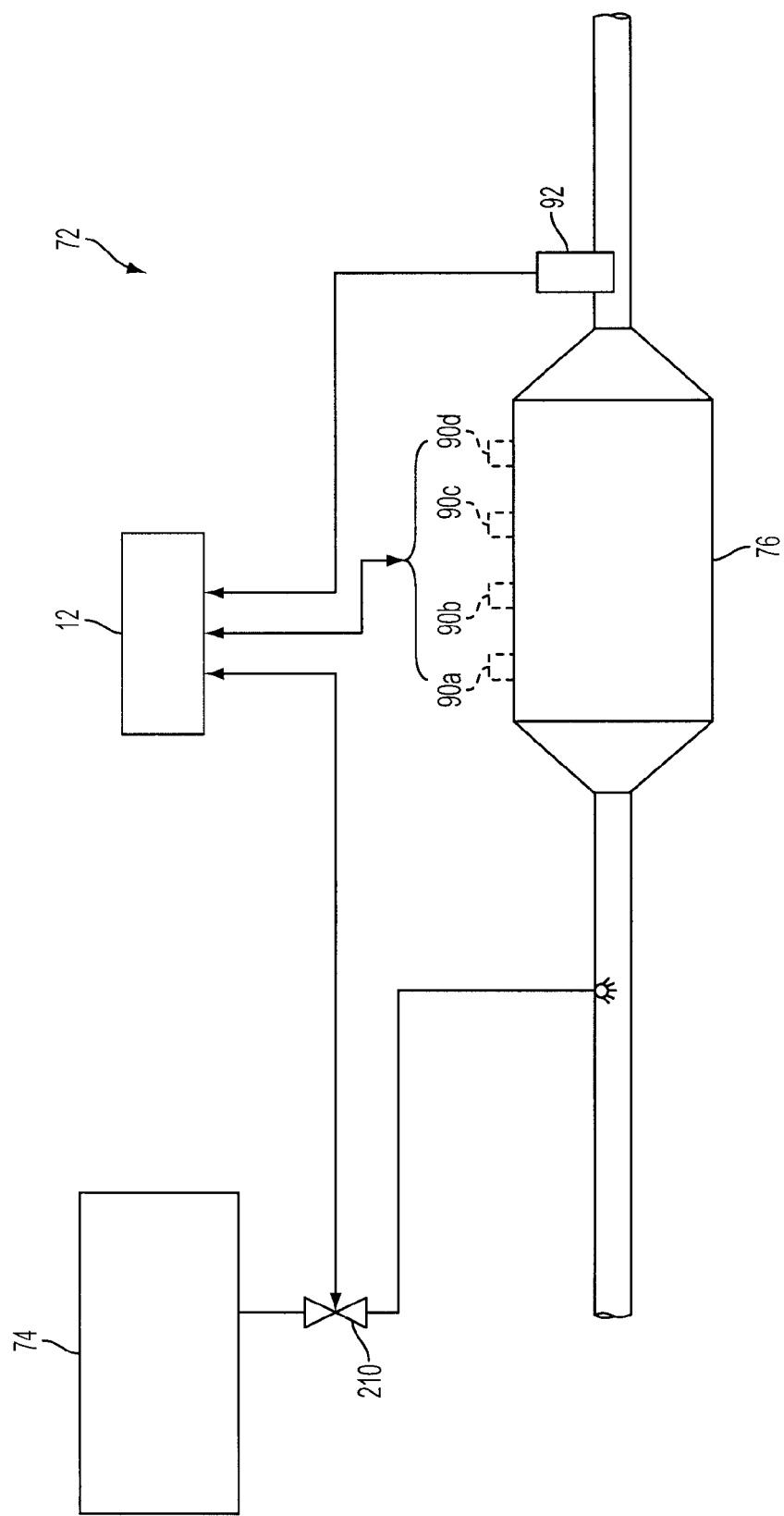
FIG. 2 shows an example exhaust system.

FIG. 2 shows an example of emissions control system 72 of engine 10. Emission control system 72 is shown coupled to a reductant storage device 74 configured to supply an ammonia-containing reductant to emission control device 76. Further, emission control system 72 may include controller 12 configured to process information within the emission control system from various components and adjusting various engine and exhaust components. In the embodiment of FIG. 2, the emission control system may further include reductant valve 210 for adjusting an amount of injected reductant, NOx sensor 92, and reductant storage sensor 90 (which is shown in various potential locations along the length of the SCR device 76 by dashed locations 90a, 90b, 90c, and 90d). In one example, a single reductant storage sensor may be used. However, in another example, a plurality of reductant storage sensors may be used, and may be positioned at various locations along the length of the catalyst. The reductant storage sensor 90 may utilize a change in conductance of the catalyst layer during a temperature change to determine a reductant storage level, as described in further detail with regard to FIG. 3. Further, controller 12 may both send and receive signals from sensor 90, such as sending a signal to control an embedded heater and receiving a sensed current or other signal indicative of reductant storage.

In one example, controller 12 may provide an event or time-based estimate of an amount and/or distribution of reductant storage in device 76, and use the estimate, along with other parameters, to adjust a reductant injection amount. In particular, the estimate may include feedback from sensor(s) 90 at selected interval as described further herein with regard to FIG. 4, for example.

Figure 3:
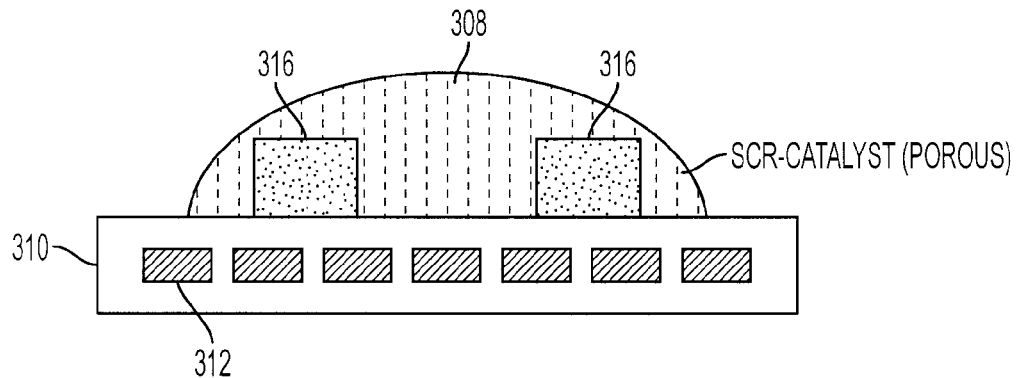
FIG. 3 shows an example sensor configuration.

FIG. 3 shows a cross-section of an example sensor configuration of sensor 90. The sensor may include various components, such as, for example, a base-metal-zeolite catalyst material which is deposited as a thick-film on an alumina substrate. Various catalytic material compositions may be used. Contained within the substrate may be one or more embedded heaters (which may or may not be physically segregated), enabling the temperature of the catalyst film to be raised up to 600° C., for example. The heater may be electrically powered, such as a resistive heater, for example.

The catalyst film may also be laid over a pair of electrodes (which for example can be made of Pt), which may be used to monitor its conductivity. In one embodiment, the conductivity may be measured monitoring the resulting current while applying a 5V peak to peak signal at approximately 4 Hz.

An example configuration of sensor 90 is shown in FIG. 3. Contained within or coupled to a base-metal-zeolite catalyst material 308 (which may be an SCR catalyst) supported on substrate 310 is a heater 312, which may be an embedded heater. The heater may be provided in a sub-region of the catalyst substrate and configured to heat the catalyst material local to the substrate sub-region. The heater may be configured to enable the temperature of the catalyst film to be raised up to a predetermined temperature, such as 600° C. Also shown is a pair of electrodes 316, which may be used to monitor conductivity of the portion of the catalyst in the vicinity of the heater.

In one example, by locally heating and desorbing NH3 stored on the portion of the SCR-catalyst coupled to the heater while monitoring the ionic conductivity of the catalyst portion, it is possible to obtain an estimate of the quantity of the stored NH3. On potential explanation for such a correlation may be due to the reporting that zeolites (such as H-ZSM5) may be a surface proton conductor whose conductivity is enhanced in the presence of NH3, enabling the ionic conductivity to be used as the basis of a selective NH3 sensor. The proton mobility along the surface may be enhanced by the formation of NH4+ ions, which are bound less tightly (have a lower activation energy for hopping along the surface). In a similar fashion, the base-metal-zeolite used in the SCR-catalyst can be used to detect NH3. Thus, heating a portion of the catalyst material to desorb the NH3 enables its change in conductivity with NH3 adsorption to be determined Conductivity may be measured, for example, by monitoring the current while applying a 5V peak-to-peak signal at 4 Hz, as noted above. Alternatively, the voltage level, frequency, etc., may be varied, or varied with operating conditions. While not shown in this example, temperature in the heated area of the catalyst may be measured by a thermocouple or some other temperature probe.

In order to advantageously utilize a catalyst system using an integrated sensor such as sensor 90, a plurality of operational modes may be used. The modes may include a "normal" operating mode where the heater is turned off, and the area above the embedded heater is at a temperature similar to adjacent SCR-catalyst material, defined as temperature T1. In this mode, the catalyst adsorbs, desorbs, and stores NH3. In some embodiments, the NH3 storage depends on the temperature T1. For example, maximum NH3 storage may depend on temperature T1. In addition, some of the adsorbed NH3 may react with NOx, or it may be oxidized.

The operational modes may further include a NH3-loading-determination-mode, in which the embedded heater is turned on, causing the temperature to increase during an interval to temperature T2. Temperature T2 may be high enough such that most of the NH3 stored on the heated portion of the catalyst layer desorbs or oxidizes. The total amount of NH3 stored in the catalyst during the "loading-mode" may then be determined from the change in conductivity brought on by desorption of stored ammonia via temperature increase, as measured by the embedded electrodes. Once at the higher temperature T2, the heater can be turned off and the temperature dropped back to T1. The heating and cooling of the sensor (T1→T2→T1) may be sufficiently rapid as to reduce any appreciable effects on the temperature of the surrounding SCR-catalyst (at T1).

Figure 4A:
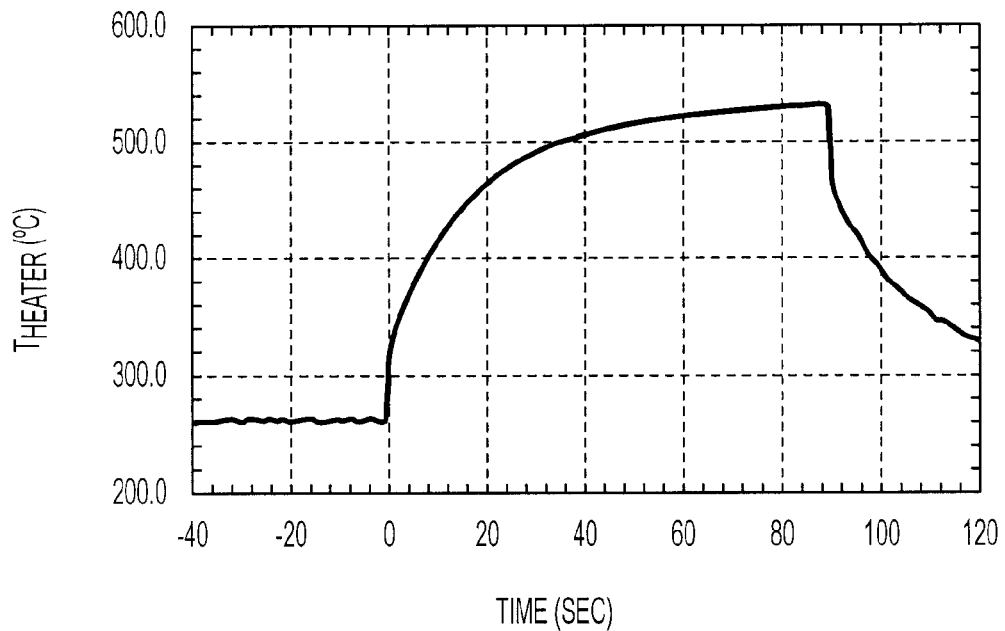
FIG. 4 shows example test data.
Figure 4B:
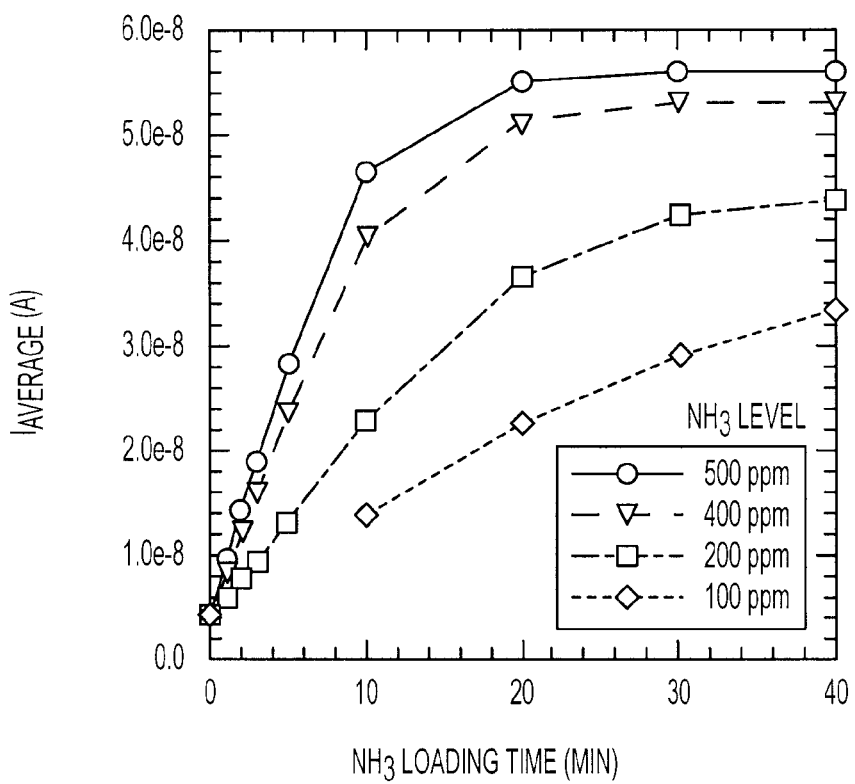
Figure 4C:
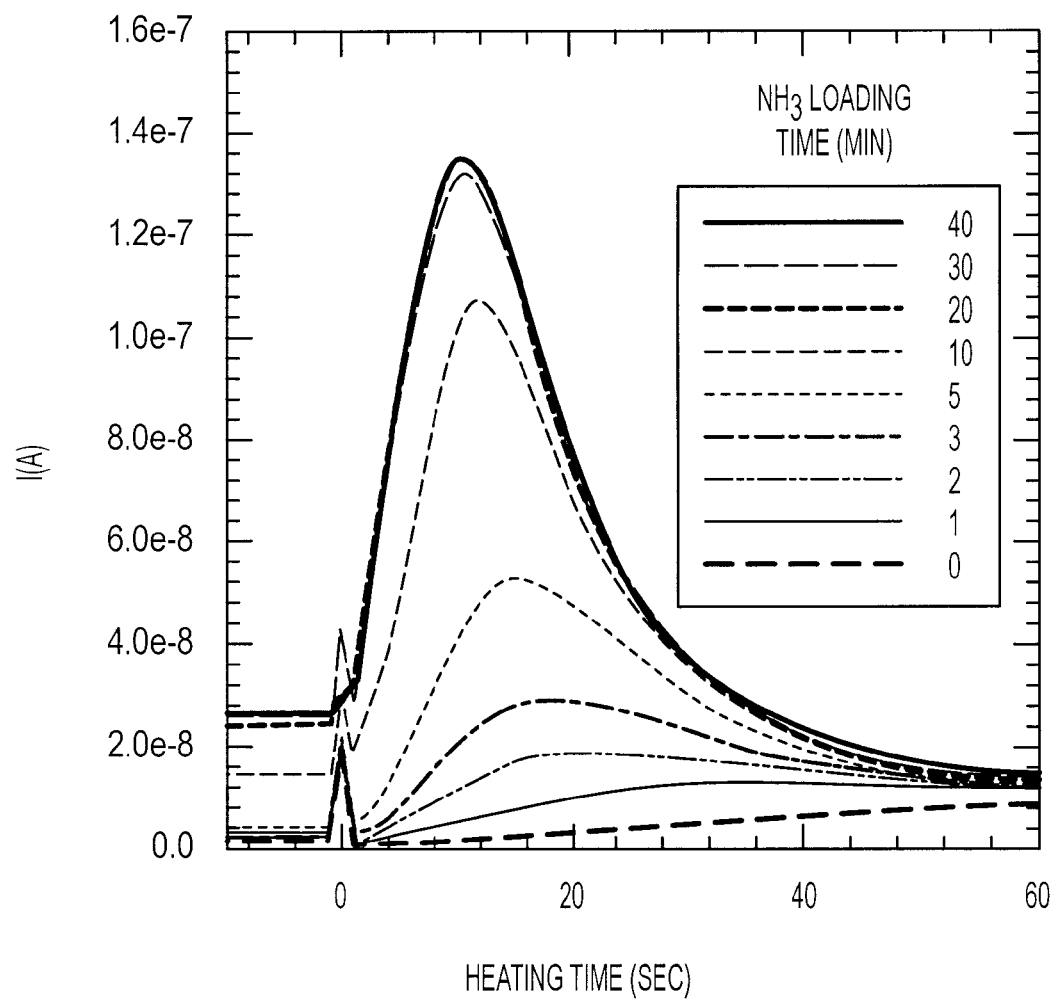

Example test data is shown illustrating example operation of a sample in FIGS. 4A-4C. The following testing procedure was followed. Prior to the start of the NH3 loading mode, the sensor was free of stored NH3. During the loading mode, the temperature was held constant and NH3 exposed to the sensor, some of which was stored on the catalyst material. During the measurement mode, the power to the heater on the backside of the ceramic substrate was increased, causing the temperature to rise sufficiently to desorb (or oxidize) the NH3 stored during the loading mode. The amount of NH3 stored during the loading mode was then determined from the change in the catalyst conductivity as the temperature was increased. All data were taken in background gases of 5% O2 and 1% water, with the balance N2, using a gas flow-bench, and may be interpreted accordingly.

FIG. 4A shows a heating provide used to desorb NH3 stored on the catalyst. The starting temperature at time t=0 was approximately 267° C. FIG. 4B gives the RMS sensor current vs. time after the substrate temperature was raised from 267° C. at t=O as shown in the corresponding heating profile of FIG. 4A. The sensor was exposed to 500 ppm NH3 for various time lengths prior to t=0, ranging from 1 to 40 minutes. Upon heating, the conductivity of the catalyst element at first increased but later decreased as it was "purged" of its stored NH3. In this example, the peak height increased with NH3 exposure time, and reached a saturation level after 20 minutes of exposure. All curves substantially converge after approximately 60 seconds of heating, a time sufficient to desorb the NH3. In one embodiment, the area under each of the I(t) curves of FIG. 4B may be used as a measure of NH3 storage. Specifically, the curves shown in FIG. 4B are integrated to give a plot of average current vs. time for the first 60 seconds of heating in FIG. 4C. Also plotted are data for different concentrations of NH3 during the loading-phase. Shown are data from 100 ppm to 500 ppm NH3. The data for the higher concentrations demonstrate that the integrated current approaches an asymptotic value with loading time, which is expected as the catalyst reaches its steady-state equilibrium loading level. The asymptotic values are also increase with NH3 level. As such, the average current as depicted in FIG. 4C can be correlated to loading as it scales with the NH3 loading on the catalyst Furthermore, the average current during the heating mode (as depicted in FIG. 4C) can decrease as the loading temperature was raised from 200° C. to 350° C. Thus, NH3 equilibrium loading on the SCR catalyst may be correlated dependent on both the NH3 level and temperature.

Figure 5:
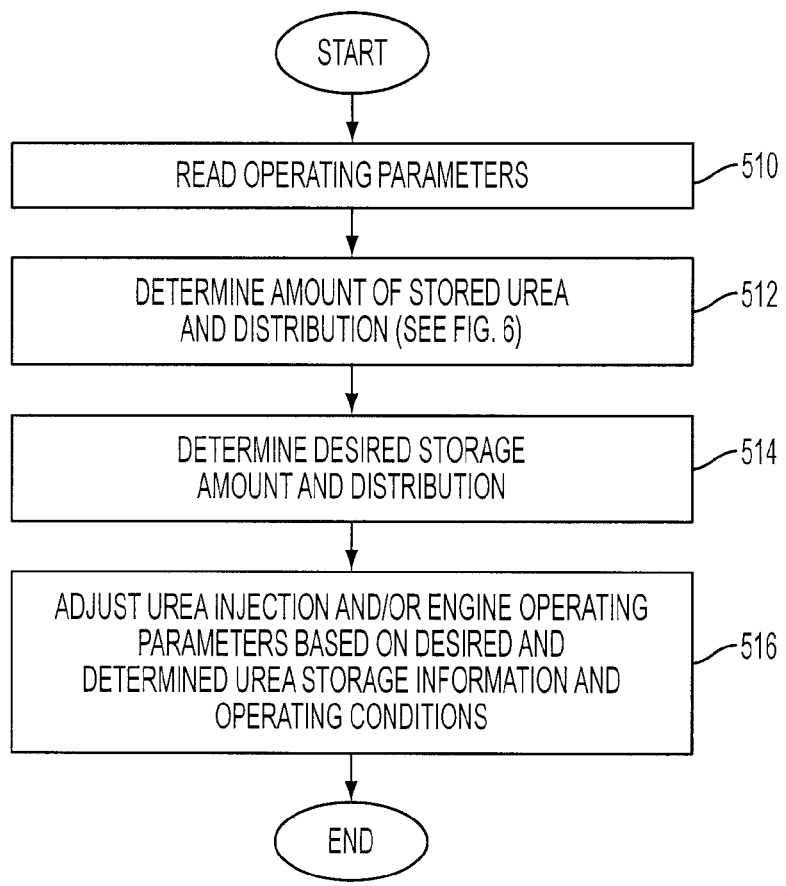
FIGS. 5-6 are high level flow charts of example operation.

Referring now to FIG. 5, an example control routine is provided for controlling emission control operation during engine operation. In 510, the routine reads various operating parameters, including engine speed, engine load, exhaust temperature, fuel injection amount, fuel injection timing, an exhaust gas recirculation amount, an airflow amount, etc. Then, in 512, the routine determines an estimated amount of urea stored in the emission control system (e.g., on the full device 76) based on a dynamic storage model and estimator as described in further detail with regard to FIG. 6. In one example, both a dynamic estimator and feedback from exhaust gas sensors, including sensor 90, may be used. Further, the routine may determine a distribution of the stored ammonia along the length of the catalyst system. Then, in 514, the routine determines a desired amount of urea stored (based on NOx emitted by engine, temperature, etc.), which may include a desired storage amount and/or a desired distribution along the catalyst. Finally, in 516, the routine adjusts urea injected and/or engine operation based on desired and actual amounts so that the actual/estimated operation approaches the desired operation Thus, in one example, the loading of NH3 on the SCR-catalyst may be controlled using information regarding the concentration of the stored NH3 along the length of the SCR-catalyst (in the direction of exhaust-gas flow) to improve control of the SCR system, therefore reducing both NOx and NH3 emissions. Further, some of the input parameters used for this model prediction may include the catalyst temperature, engine speed, urea injection dosage, measured reductant loading, and/or measured NOx levels emitted from the engine. Specifically, one or more sensors 90a-90d may be used to indicate the NH3 storage level in the catalyst, possibly at several locations along the catalyst length. The information may be used to adjust reductant injection to provide a desired loading and distribution within the catalyst. Further, it may be used to provide an improved indication of catalyst degradation.

One method to maintain a desired NH3-loading profile along the SCR-catalyst may be based on a model of NOx levels emitted by the engine, quantity of urea injection, temperature, gas flow, NOx-NH3 reaction rates and NH3 storage along the SCR-catalyst. This approach may further utilize NOx and/or NH3 sensors located downstream of the catalyst, providing feedback to help ensure that the slip of these gases are minimized, while also utilizing an indication of ammonia storage from a sensor, such as sensor 90.

Figure 6:
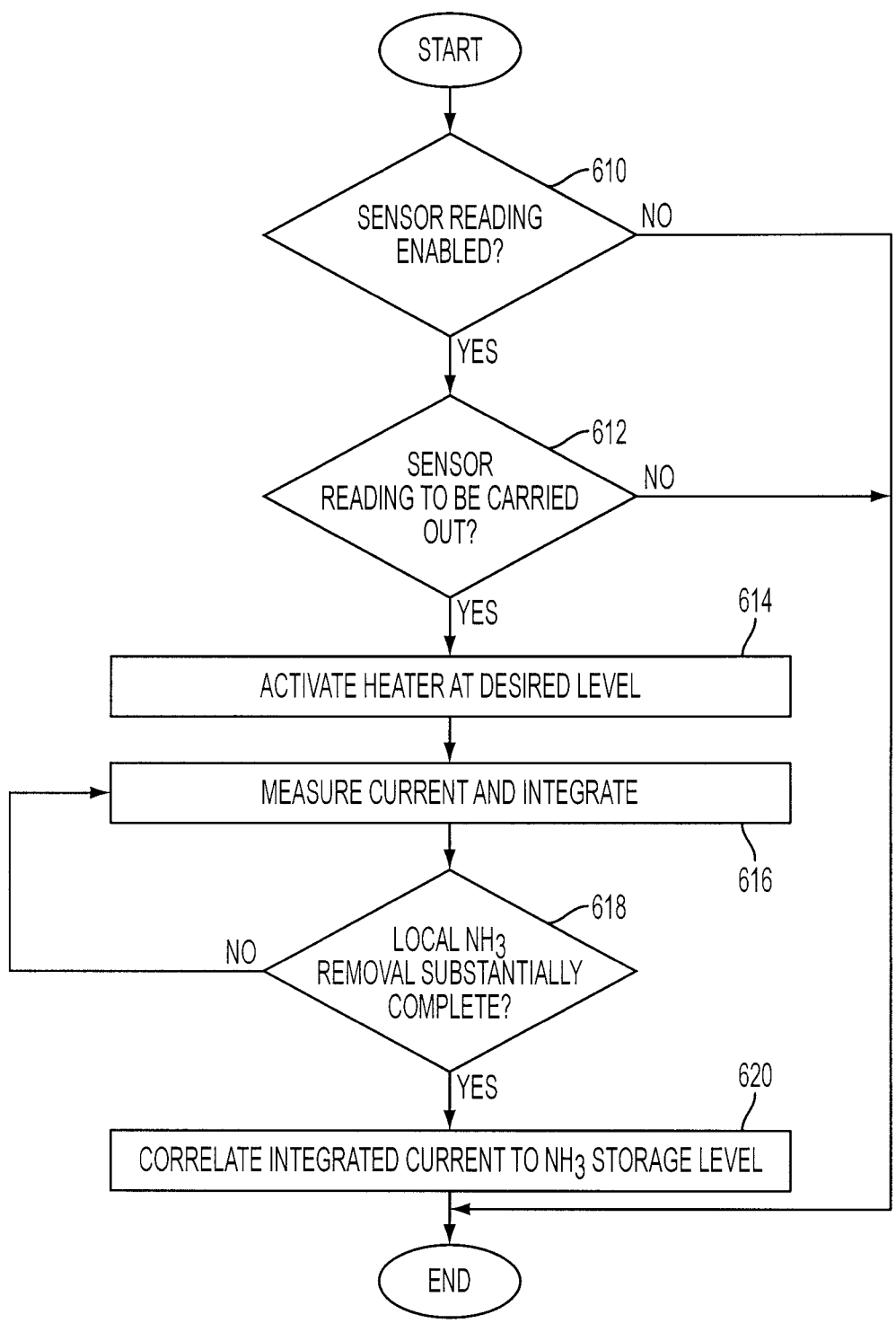

Referring now to FIG. 6, additional operational information is provided for sensing ammonia storage in the SCR device 76 via sensor(s) 90, while accounting for various parameters. For example, the routine may manage various aspects of the ammonia storage sensing and/or estimation, including determining when to sense, controlling heater operation, monitoring voltage/conductivity/impedance/current, identifying when sufficient temperature increase has occurred in order to substantially remove locally stored ammonia, and correlating sensed information depending on the operating conditions.

Specifically, in 610, the routine determines whether sensor reading is enabled. The sensor reading may be enabled during a predetermined exhaust temperature window, or range of temperature windows, after a predetermined amount of engine operating from a start, when engine coolant reaches a threshold value, and/or various other conditions. If so, the routine continues to 612 to determine whether sensor reading is to be carried out. For example, the routine may determine whether a request to measured stored ammonia has been requested from the controller 12, such as from an estimation routine and/or control routine for estimating/controlling injected ammonia/urea.

If so, the routine continues to 614 to activate the embedded heater at a desired heating level. The desired heating level may be adjusted based on various factors, including space velocity, exhaust temperature, estimated ammonia loading, catalyst temperature before activation of the heater, etc. Then, in 616, the routine measures a current and integrates the information. Then, in 618, the routine determines whether the local NH3 removal is substantially complete. This may be based on the amount of time the heater is activated, the level of heater activation, exhaust temperature, etc. When the answer to 618 is no, the routine returns to 616. Otherwise, the routine continues to 620 to correlate the integrated current to reductant storage, taking into account the operating conditions before and/or during the sensing.

In this way, an accurate reading of stored ammonia may be achieved. Note that the routine of FIG. 6 is described for a single sensor/heater coupled in device 76. However, it may be repeated and/or combined for a plurality of sensors (e.g., 90a-90d) if desired. Further, the sensing may be requested at specific repeated operating conditions to improve the accuracy of the storage level indication. Further still, the sensing may be requested/performed whenever exhaust and/or catalyst temperature falls within a selected window, or above/below a selected threshold.

Finally, the sensing may include calibration errors, drift, etc. As such, the correlation may be adapted/updated at selected conditions when the catalyst storage is known, such as when it is known to be zero, such as during substantially elevated conditions which may include a particulate filter regeneration.

Note that the control routines included herein can be used with various engine configurations, such as those described above. The specific routine described herein may represent one or more of any number of processing strategies such as event-driven, interrupt-driven, multi-tasking, multi-threading, and the like. As such, various acts or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions or functions may be repeatedly performed depending on the particular strategy being used. Further, the described steps may graphically represent code to be programmed into the computer readable storage medium in controller 12.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-8, V-10, V-12, opposed 4, and other engine types. As another example, various other mechanisms may be used in a system using two different valve profiles for each of the valves in a cylinder, and the selective deactivation of one or more valves to provide the correct flow conditions for compression or auto-ignition combustion. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of sensing operation of an SCR engine exhaust treatment device having base-metal-zeolite supported on a substrate, comprising:
increasing temperature of a sub-region of the substrate;
monitoring a change by sensing a conductivity of the base-metal-zeolite local to the sub-region; and
outputting information based on said monitored change including correlating the change to an amount of stored ammonia in the base-metal-zeolite local to the sub-region.

2. The method of claim 1 wherein said monitoring includes monitoring electrodes coupled in the sub-region of the substrate.

3. The method of claim 1 where temperature is increased to a preselected value by applying heat to the sub-region of the substrate.

4. The method of claim 3 wherein an amount of heat supplied is varied with operating conditions.

5. The method of claim 1 wherein temperature is increased to substantially remove reductant stored on the base-metal-zeolite local to the sub-region, without removing ammonia stored in a remaining region of the base-metal-zeolite.

6. The method of claim 5 wherein the information is correlated to an amount of ammonia stored throughout the SCR engine exhaust treatment device.

7. The method of claim 6 further comprising varying an amount of reductant injected into the device to vary a level of storage in response to the information.

8. The method of claim 7 further comprising applying an oscillating voltage signal to electrodes located in the sub-region of the substrate.

9. The method of claim 8 further comprising integrating a resulting current generated by the oscillating voltage signal.

10. The method of claim 9, wherein said output information is based on said integrated current.

11. A method of controlling engine operation, an engine having an SCR emission control device coupled in an engine exhaust, comprising:

estimating an amount of ammonia stored in the SCR emission control device based on an operating condition by locally increasing temperature of a sub-region of the device, the temperature increased by supplying heat, wherein an amount of heat supplied is varied with operating parameters;

measuring ammonia storage in the sub-region of the device and correlating said measure to an amount of ammonia stored throughout the SCR emission control device; and adjusting an amount of reductant injection into the exhaust based on said estimated and measured amounts.

12. A method of sensing operation of an SCR engine exhaust treatment device having a base-metal-zeolite supported on a substrate, comprising:

increasing temperature of a sub-region of the substrate to substantially remove reductant stored on the base-metal-zeolite local to the sub-region, without removing ammonia stored in a remaining region of the base-metal-zeolite;

monitoring a change in conductivity of the base-metal-zeolite local to the sub-region; and outputting information based on said monitored conductivity change.

13. The method of claim 12 wherein outputting information based on said monitored conductivity change includes correlating the conductivity change to an amount of stored ammonia in the base-metal-zeolite local to the sub-region.

* * * * *